(12) United States Patent
Swei et al.

(10) Patent No.: US 7,776,446 B2
(45) Date of Patent: *Aug. 17, 2010

(54) MULTI-LAYER RELEASE FILMS

(75) Inventors: Gwo Swei, Vandalia, OH (US); John R. Kastelic, Houston, TX (US); Alexander Tukachinsky, Holden, MA (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 848 days.

This patent is subject to a terminal disclaimer.

(21) Appl. No.: 11/352,910

(22) Filed: Feb. 13, 2006
(Under 37 CFR 1.47)

(65) Prior Publication Data

US 2006/0275610 A1 Dec. 7, 2006

Related U.S. Application Data

(63) Continuation-in-part of application No. 10/663,288, filed on Sep. 16, 2003, now Pat. No. 6,998,007, which is a continuation-in-part of application No. 09/873,612, filed on Jun. 4, 2001, now Pat. No. 6,652,943.

(51) Int. Cl.
*B32B 7/04* (2006.01)
*B32B 27/08* (2006.01)
*B32B 27/28* (2006.01)
*B32B 27/32* (2006.01)

(52) U.S. Cl. ............... 428/421; 428/422; 428/500; 428/515; 428/516; 428/517; 428/519; 428/520; 428/521; 428/522; 525/232; 525/240

(58) Field of Classification Search .......... None
See application file for complete search history.

(56) References Cited

U.S. PATENT DOCUMENTS

| 3,151,173 | A | * | 9/1964 | Nyee ................. 585/360 |
| 3,269,862 | A | | 8/1966 | Lanza et al. |
| 3,646,169 | A | | 2/1972 | Wirth |
| 3,650,827 | A | | 3/1972 | Brown et al. |
| 3,758,643 | A | * | 9/1973 | Fischer ............... 525/51 |
| 3,806,558 | A | * | 4/1974 | Fischer ............... 525/198 |
| 4,041,207 | A | | 8/1977 | Takada et al. |

(Continued)

FOREIGN PATENT DOCUMENTS

EP 0376681 A 7/1990

(Continued)

OTHER PUBLICATIONS

Whelan, Tony, Polymer Technology Dictionary (1994), pp. 160-161.*

(Continued)

*Primary Examiner*—Vivian Chen
(74) *Attorney, Agent, or Firm*—Larson Newman & Abel, LLP; Chi Suk Kim

(57) ABSTRACT

A multilayer film includes a first layer including a blend of a polyolefin and a diene elastomer, a second layer directly contacting and directly bonded to the first layer, and a third layer directly contacting and directly bonded to the first layer. The second and third layers include a fluoropolymer.

10 Claims, 2 Drawing Sheets

U.S. PATENT DOCUMENTS

| | | | |
|---|---|---|---|
| 4,113,806 A * | 9/1978 | Watson et al. | 525/210 |
| 4,130,535 A | 12/1978 | Coran et al. | |
| 4,155,823 A | 5/1979 | Gotcher et al. | |
| 4,507,411 A | 3/1985 | Gordon et al. | |
| 4,677,017 A | 6/1987 | DeAntonis et al. | |
| 4,710,544 A | 12/1987 | Wolfe, Jr. | |
| 4,840,849 A | 6/1989 | Harada et al. | |
| 4,957,968 A * | 9/1990 | Adur et al. | 525/74 |
| 5,093,166 A | 3/1992 | Nishimura | |
| 5,266,627 A | 11/1993 | Meverden et al. | |
| 5,281,766 A | 1/1994 | Hildreth | |
| 5,284,889 A * | 2/1994 | Pyun et al. | 524/94 |
| 5,334,450 A | 8/1994 | Zabrocki et al. | |
| 5,427,831 A * | 6/1995 | Stevens | 428/36.2 |
| 5,480,721 A | 1/1996 | Pozzoli et al. | |
| 5,578,681 A | 11/1996 | Tabb | |
| 5,658,670 A * | 8/1997 | Fukushi et al. | 428/421 |
| 5,695,838 A * | 12/1997 | Tanaka et al. | 428/35.2 |
| 5,696,213 A * | 12/1997 | Schiffino et al. | 526/158 |
| 5,804,661 A * | 9/1998 | Davis et al. | 525/240 |
| 5,832,636 A | 11/1998 | Lyden et al. | |
| 5,843,577 A * | 12/1998 | Ouhadi et al. | 428/474.7 |
| 5,855,977 A * | 1/1999 | Fukushi et al. | 428/36.6 |
| 5,866,663 A | 2/1999 | Brookhart et al. | |
| 5,880,241 A | 3/1999 | Brookhart et al. | |
| 5,880,323 A | 3/1999 | Brookhart, III et al. | |
| 5,886,224 A | 3/1999 | Brookhart et al. | |
| 5,916,659 A | 6/1999 | Koerber et al. | |
| 5,916,989 A | 6/1999 | Brookhart, III et al. | |
| 6,080,487 A * | 6/2000 | Coggio et al. | 428/422 |
| 6,096,428 A * | 8/2000 | Jing et al. | 428/421 |
| 6,107,422 A | 8/2000 | Wang et al. | |
| 6,117,375 A | 9/2000 | Garrett et al. | |
| 6,140,439 A | 10/2000 | Brookhart et al. | |
| 6,197,393 B1 * | 3/2001 | Jing et al. | 428/35.9 |
| 6,207,277 B1 | 3/2001 | Shieh | |
| 6,211,291 B1 * | 4/2001 | Rolland et al. | 525/74 |
| 6,288,156 B1 | 9/2001 | Hausmann | |
| 6,300,418 B1 * | 10/2001 | Brzoskowski et al. | 525/191 |
| 6,372,870 B1 | 4/2002 | Kitahara et al. | |
| 6,391,460 B1 | 5/2002 | Tanaka et al. | |
| 6,432,542 B1 | 8/2002 | Tsai | |
| 6,482,522 B1 * | 11/2002 | Parsonage et al. | 428/421 |
| 6,494,977 B1 | 12/2002 | Waldenberger et al. | |
| 6,506,842 B1 | 1/2003 | Heck et al. | |
| 6,514,888 B1 | 2/2003 | Tanaka et al. | |
| 6,524,671 B1 * | 2/2003 | Spohn | 428/35.7 |
| 6,534,569 B2 | 3/2003 | Mahmud et al. | |
| 6,538,084 B2 | 3/2003 | Kitahara et al. | |
| 6,632,518 B1 | 10/2003 | Schmidt et al. | |
| 6,652,943 B2 * | 11/2003 | Tukachinsky et al. | 428/36.91 |
| 6,667,101 B2 * | 12/2003 | Silagy et al. | 428/411.1 |
| 6,670,297 B1 | 12/2003 | Brookhart et al. | |
| 6,686,012 B1 * | 2/2004 | Molnar et al. | 428/36.91 |
| 6,742,545 B2 | 6/2004 | Fisher et al. | |
| 6,753,087 B2 * | 6/2004 | Jing et al. | 428/421 |
| 6,790,510 B1 * | 9/2004 | Nishio et al. | 428/141 |
| 6,838,520 B2 * | 1/2005 | Etherton | 525/191 |
| 6,897,272 B1 | 5/2005 | Brookhart et al. | |
| 6,946,182 B1 | 9/2005 | Allgeuer et al. | |
| 6,960,377 B2 * | 11/2005 | Shifman | 428/36.7 |
| 6,998,007 B2 * | 2/2006 | Tukachinsky et al. | 156/272.2 |
| 2002/0027110 A1 | 3/2002 | Mahmud et al. | |
| 2002/0070473 A1 | 6/2002 | Shifman et al. | |
| 2002/0128412 A1 | 9/2002 | Kitahara et al. | |
| 2002/0197482 A1 * | 12/2002 | Tukachinsky et al. | 428/421 |
| 2003/0071069 A1 | 4/2003 | Shelton | |
| 2003/0082386 A1 | 5/2003 | Hussey et al. | |
| 2004/0058162 A1 * | 3/2004 | Tukachinsky et al. | 428/422 |
| 2004/0102591 A1 | 5/2004 | Brookhart et al. | |
| 2004/0124550 A1 | 7/2004 | Casper et al. | |
| 2004/0127614 A1 | 7/2004 | Jiang et al. | |
| 2004/0197510 A1 | 10/2004 | Shifman | |
| 2004/0229043 A1 | 11/2004 | Spohn et al. | |
| 2005/0003204 A1 | 1/2005 | Frankel et al. | |
| 2005/0025956 A1 | 2/2005 | Bainbridge | |
| 2005/0123764 A1 | 6/2005 | Hoffmann et al. | |
| 2005/0131119 A1 | 6/2005 | Wood | |
| 2005/0143508 A1 | 6/2005 | Tyagi et al. | |
| 2005/0187372 A1 | 8/2005 | Venderbosch et al. | |
| 2006/0020076 A1 | 1/2006 | Finerman et al. | |
| 2006/0029775 A1 | 2/2006 | MacKinnon et al. | |
| 2006/0052540 A1 | 3/2006 | Ellul et al. | |
| 2006/0275572 A1 * | 12/2006 | Bonnet et al. | 428/36.91 |
| 2007/0128394 A1 | 6/2007 | Frankel et al. | |
| 2007/0190335 A1 * | 8/2007 | Swei et al. | 428/421 |
| 2007/0202311 A1 * | 8/2007 | Swei et al. | 428/213 |
| 2008/0029210 A1 * | 2/2008 | Swei et al. | 156/272.2 |

FOREIGN PATENT DOCUMENTS

| | | |
|---|---|---|
| EP | 0405089 A | 1/1991 |
| EP | 0 137 519 B1 | 8/1991 |
| EP | 0989302 A2 | 3/2000 |
| EP | 1 038 904 A1 | 9/2000 |
| EP | 1 131 375 B1 | 3/2004 |
| EP | 0 992 518 B1 | 9/2004 |
| EP | 1 356 226 B1 | 4/2005 |
| EP | 1 541 337 A1 | 6/2005 |
| EP | 1 541 338 A1 | 6/2005 |
| EP | 1 541 642 A1 | 6/2005 |
| EP | 1 605 002 A1 | 12/2005 |
| JP | 2003 211472 A | 7/2003 |
| WO | WO 98/05493 * | 2/1998 |
| WO | WO 98/32795 | 7/1998 |
| WO | WO 01/05573 A1 | 1/2001 |
| WO | WO 01/55245 A2 | 8/2001 |
| WO | WO 01/69610 A1 | 9/2001 |
| WO | WO 02/16111 A1 | 2/2002 |
| WO | WO 2004/065467 A1 | 8/2004 |
| WO | WO 2004/076541 A2 | 9/2004 |
| WO | WO 2004/101274 A2 | 11/2004 |
| WO | WO 2005/078808 A1 | 8/2005 |
| WO | 2006/121194 A | 11/2006 |

OTHER PUBLICATIONS

Wright, Ralph E.; "Molded Thermosets; A Handbook for Plastics Engineers, Molders, and Designers"; Hanser Publishers; Oxford University Press; New York; 1991.

V. Palissery, et al.; "Mechanical Characerisation of a Rigid Polymer Foam to Model Cancellous Bone"; Bioengineering Sciences Research Group; University of Southampton.

"Encyclopedia of Polymer Science and Engineering"; Supplement Volume; John Wiley & Sons; pp. 109-110.

U.S. Appl. No. 11/352,911, filed Feb. 13, 2006, Gwo Swei, et al.

Alger, Polymer Science Dictionary, 2nd Edition, p. 554, Apr. 1999.

USPTO Office Action for (U.S. Appl. No. 11/352,911) mailed Apr. 14, 2008.

Ebnesajjad, Sina et al. "Manufacturing Parts from Melt-processible Fluoropolymers" Fluoropolymers Applications in Chemical Processing Industries—The Definitive User's Guide and Databook, William Andrew Publishing/Plastics Design Library, pp. 193-252.

* cited by examiner

MULTI-LAYER RELEASE FILMS

CROSS REFERENCE TO RELATED APPLICATIONS

The present application is a continuation-in-part of and claims priority from U.S. Utility patent application Ser. No. 10/663,288, now U.S. Utility Pat. No. 6,998,007, filed Sep. 16, 2003, entitled "MULTILAYER STRUCTURE WITH INTERCROSSLINKED POLYMER LAYERS," naming inventors Alexander Tukachinsky, Michael L. Friedman, and Paul W. Ortiz, which is a continuation-in-part of and claims priority from U.S. Utility patent application Ser. No. 09/873,612, now U.S. Utility Pat. No. 6,652,943, filed Jun. 4, 2001, which applications are incorporated by reference herein in their entirety.

FIELD OF THE DISCLOSURE

This disclosure, in general, relates to multi-layer release films and methods for making such films.

BACKGROUND

Increasingly, manufacturers are seeking polymers to create surfaces that are resistant to chemical and environmental damage. In addition, manufacturers are seeking films that have release characteristics, forming a surface that is resistant to adhesion with other surfaces. In particular applications, films formed of such polymers have been used as airplane and train cargo holders, vinyl siding surface treatments, photovoltaic protective coverings, and release films. An example of such polymers includes low surface energy polymers. Low surface energy polymers, such as fluoropolymers, exhibit a resistant to damage caused by exposure to chemicals, such as methyl ethyl ketone (MEK), have a resistance to stains, demonstrate a resistance to damage caused by exposure to environmental conditions, and typically, form a release surface.

While such low surface energy polymers are in demand, the polymers tend to be expensive. In addition, such polymers exhibit low wetting characteristics and given their tendency to form a release surface, adhere poorly with other polymer substrates. For particular fluoropolymers, such as PVDF, manufacturers have turned to adhesive layers including acrylic polymers to adhere the fluoropolymer layer to incompatible substrates. However, acrylic polymers are typically less tolerant of environmental stresses, such as ultraviolet light exposure and high temperature. As such, the bond between a fluoropolymer layer film and an underlying substrate may degrade with time. Moreover, mismatches between mechanical properties of an underlying substrate and a fluoropolymer layer degrade the contact between the layers and the substrate with ongoing mechanical stress, resulting in reduced peel strength and a potential degradation of the bond between the fluoropolymer layer and the underlying film layers.

As such, an improved multi-layer film and a method for manufacturing such multi-layer films would be desirable.

SUMMARY

In a particular embodiment, a multilayer film includes a first layer including a blend of a polyolefin and a diene elastomer and a second layer directly contacting and directly bonded to the first layer. The second layer includes a fluoropolymer.

In another exemplary embodiment, a multilayer film includes a first layer including a blend of polyolefin and ethylene propylene diene monomer (EPDM) elastomer and includes a second layer directly contacting and directly bonded to the first layer. The second layer includes a fluoropolymer.

In a further exemplary embodiment, a multilayer film includes a first layer comprising a blend of polyolefin and ethylene propylene diene monomer (EPDM) elastomer. The polyolefin is selected from the group consisting of polyethylene and polypropylene. The multilayer film also includes a second layer directly contacting and directly bonded to the first layer. The second layer includes fluorinated ethylene propylene copolymer.

BRIEF DESCRIPTION OF THE DRAWINGS

The present disclosure may be better understood, and its numerous features and advantages made apparent to those skilled in the art by referencing the accompanying drawings.

DESCRIPTION OF THE DRAWINGS

In a particular embodiment, a multi-layer film includes first and second layers. The first layer may include a blend of a diene elastomer and a polyolefin. For example, the blend may include a diene elastomer and at least about 40% by weight polyolefin. The second layer includes a low surface energy polymer. For example, the low surface energy polymer may include a fluoropolymer. The second layer is bonded directly to and directly contacts the first layer. In an exemplary embodiment, the multi-layer film may also include a third layer bonded directly to and directly contacting the first layer. The third layer may include, for example, the low surface energy polymer. In a particular example, the second and third layers form opposite outermost layers of the multi-layer film.

In an exemplary embodiment, the multi-layer film may be formed by blending a diene elastomer and at least 40% by weight of a polyolefin. A multi-layer film including first and second layers may be extruded. The first layer includes the blend of diene elastomer and polyolefin. The second layer includes a low surface energy polymer. In an exemplary embodiment, the first and second layers are coextruded so as to directly contact each other. In addition, the first layer may be cured, such as through crosslinking. For example, the multi-layer film may be exposed to radiation, such as e-beam radiation or ultraviolet electromagnetic radiation. Alternatively, water activated crosslinking agents may be used to cure the polymer blend of the first layer.

Figure 1:
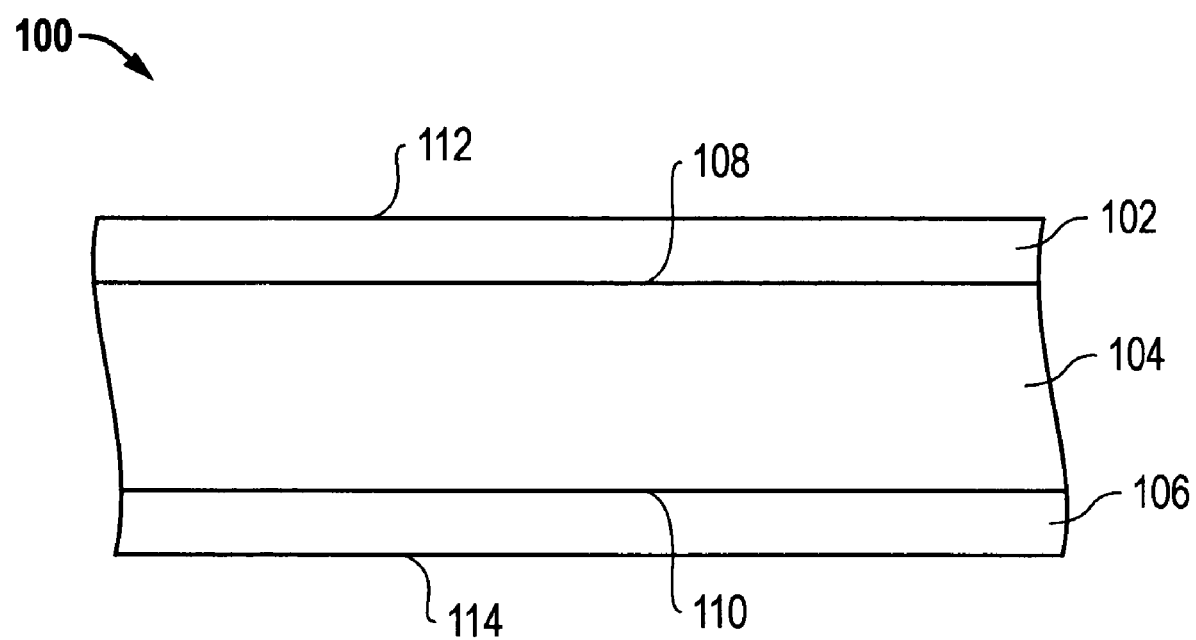
FIG. 1 includes an illustration of an exemplary multi-layer film.
Figure 2:
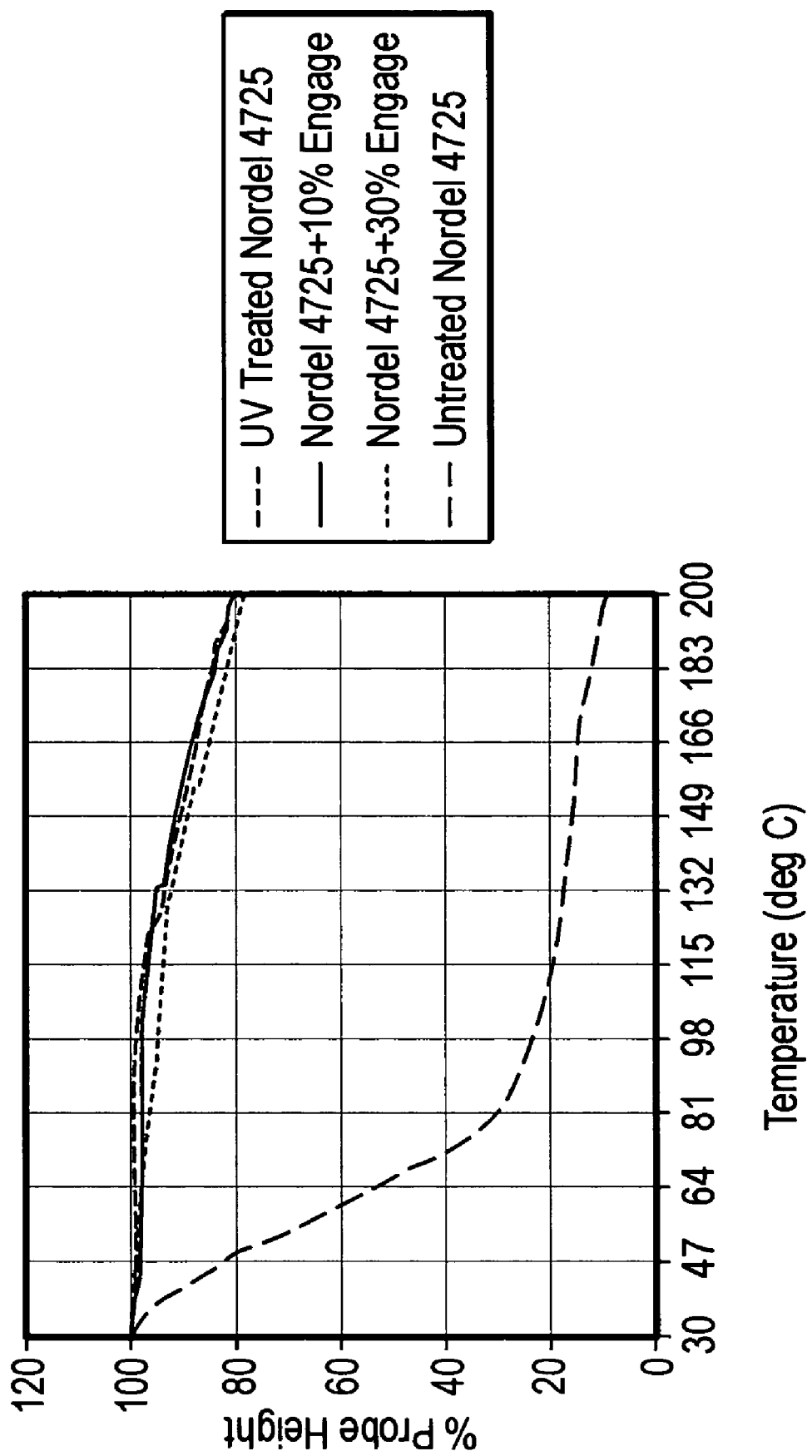
FIG. 2 includes a graphical illustration of data representing the thermal performance of blends of polyolefin and diene elastomer.

As illustrated in FIG. 1, a multi-layer film 100 may include a layer 102, which forms an outermost surface 112. The layer 102 may be bonded to a layer 104 along a major surface 108 of the layer 104. In an exemplary embodiment, the multi-layer film 100 includes two layers, such as the layer 102 and the layer 104. Alternatively, the multi-layer film 100 may include two or more layers, such as three layers. For example, a third layer 106 may be bonded to a second major surface 110 of the layer 104. The second major surface 110 is, for example, a major surface opposite the major surface 108. In such an example, the third layer 106 may form an outermost surface 114 opposite the outermost surface 112. In a further alternative embodiment, the layer 104 may be formed of multiple core or intermediate layers.

In general, the intermediate layer 104 has greater thickness than the outermost layer 102 or optional outermost layer 106. For example, an outermost layer, such as the layer 102 and optionally, the layer 106, may form not greater than about 20% by volume of the multi-layer film 100. For example, the layer 102 may form not greater than about 15% by volume of the multi-layer film 100, such as not greater than about 10% by volume of the multi-layer film 100. The intermediate layer 104 may form at least about 60% by volume of the multi-layer film 100, such as at least about 70% by volume or at least about 80% by volume of the multi-layer film 100. The total film thickness of the multi-layer film 100 may be at least about 13 microns. For example, the multi-layer film 100 may have a total thickness of at least about 25 microns, such as at least about 50 microns, at least about 100 microns, or as high as 200 microns or higher.

In an exemplary embodiment, the layer 102 includes a low surface energy polymer. For example, a low surface energy polymer may be a polymer that has a tendency to form a low surface energy surface. In an example, a low surface energy polymer includes a fluoropolymer. An exemplary fluoropolymer may be formed of a homopolymer, copolymer, terpolymer, or polymer blend formed from a monomer, such as tetrafluoroethylene, hexafluoropropylene, chlorotrifluoroethylene, trifluoroethylene, vinylidene fluoride, vinyl fluoride, perfluoropropyl vinyl ether, perfluoromethyl vinyl ether, or any combination thereof. An exemplary fluoropolymer includes a fluorinated ethylene propylene copolymer (FEP), a copolymer of tetrafluoroethylene and perpfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), poly vinylidene fluoride (PVDF), a terpolymer including tetrafluoroethylene, hexafluoropropylene, and vinylidenefluoride (THV), or any blend or any alloy thereof. For example, the fluoropolymer may include FEP. In a further example, the fluoropolymer may include PVDF. In an exemplary embodiment, the fluoropolymer may be a polymer crosslinkable through radiation, such as e-beam. An exemplary crosslinkable fluoropolymer may include ETFE, THV, PVDF, or any combination thereof. A THV resin is available from Dyneon 3M Corporation Minneapolis, Minn. An ECTFE polymer is available from Ausimont Corporation (Italy) under the trade name Halar. Other fluoropolymers used herein may be obtained from Daikin (Japan) and DuPont (USA). In particular, FEP fluoropolymers are commercially available from Daikin, such as NP-12X.

In an exemplary embodiment, the layer 104 includes an elastomeric material. In a particular embodiment, the elastomeric material includes a crosslinkable elastomeric polymer. For example, the layer 104 may include a diene elastomer. In a particular example, the elastomeric material includes a blend of a diene elastomer and a polyolefin. In a particular example, the diene elastomer is a copolymer formed from at least one diene monomer. For example, the diene elastomer may be a copolymer of ethylene, propylene and diene monomer (EPDM). An exemplary diene monomer includes a conjugated diene, such as butadiene, isoprene, chloroprene, or the like; a non-conjugated diene including from 5 to about 25 carbon atoms, such as 1,4-pentadiene, 1,4-hexadiene, 1,5-hexadiene, 2,5-dimethyl-1,5-hexadiene, 1,4-octadiene, or the like; a cyclic diene, such as cyclopentadiene, cyclohexadiene, cyclooctadiene, dicyclopentadiene, or the like; a vinyl cyclic ene, such as 1-vinyl-1-cyclopentene, 1-vinyl-1-cyclohexene, or the like; an alkylbicyclononadiene, such as 3-methylbicyclo-(4,2,1)-nona-3,7-diene, or the like; an indene, such as methyl tetrahydroindene, or the like; an alkenyl norbornene, such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, or the like; a tricyclodiene, such as 3-methyltricyclo (5,2,1,0$^2$,6)-deca-3,8-diene or the like; or any combination thereof. In a particular embodiment, the diene includes a non-conjugated diene. In another embodiment, the diene elastomer includes alkenyl norborene. The diene elastomer may include, for example, ethylene from about 63 wt % to about 95 wt % of the polymer, propylene from about 5 wt % to about 37 wt %, and the diene monomer from about 0.2 wt % to about 15 wt %, based upon the total weight of the diene elastomer. In a particular example, the ethylene content is from about 70 wt % to about 90 wt %, propylene from about 17 wt % to about 31 wt %, and the diene monomer from about 2 wt % to about 10 wt % of the diene elastomer. The diene elastomer typically has a Mooney viscosity of at least about 20, such as about 25 to about 150 (ML 1+8 at 125° C.). In an exemplary embodiment, the diene elastomer has a dilute solution viscosity (DSV) of at least about 1, such as about 1.3 to about 3 measured at 25° C. as a solution of 0.1 grams of diene polymer per deciliter of toluene. Prior to crosslinking, the diene elastomer may have a green tensile strength of about 800 psi to about 1,800 psi, such as about 900 psi to about 1,600 psi. The uncrosslinked diene elastomer may have an elongation at break of at least about 600 percent. In general, the diene elastomer includes a small amount of a diene monomer, such as a dicyclopentadiene, a ethylnorborene, a methylnorborene, a non-conjugated hexadiene, or the like, and typically have a number average molecular weight of from about 50,000 to about 100,000. Exemplary diene elastomers are commercially available under the tradename Nordel from Dow Dupont.

The polyolefin of the blend may include a homopolymer, a copolymer, a terpolymer, an alloy, or any combination thereof formed from a monomer, such as ethylene, propylene, butene, pentene, methyl pentene, octene, or any combination thereof. An exemplary polyolefin includes high density polyethylene (HDPE), medium density polyethylene (MDPE), low density polyethylene (LDPE), ultra low density polyethylene, ethylene propylene copolymer, ethylene butene copolymer, polypropylene (PP), polybutene, polypentene, polymethylpentene, polystyrene, ethylene propylene rubber (EPR), ethylene octene copolymer, or any combination thereof. In a particular example, the polyolefin includes high density polyethylene. In another example, the polyolefin includes polypropylene. In a further example, the polyolefin includes ethylene octene copolymer. In a particular embodiment, the polyolefin is not a modified polyolefin, such as a carboxylic functional group modified polyolefin, and in particular, is not ethylene vinyl acetate. In addition, the polyolefin is not formed from a diene monomer. In a particular example, the polyolefin has a degree of crystallinity. For example, the polyolefin may have at least about 35% crystallinity. In a particular example, the polyolefin may have a crystallinity of at least about 50%, such as at least about 60% or at least about 70% crystallinity. In a particular example, the polyolefin may be a high crystallinity polyolefin. Alternatively, the polyolefin may be a low crystallinity polyolefin, having a crystallinity not greater than 35%. Low crystallinity polyolefins may enhance conformability of release films or improve clarity. An exemplary commercially available polyolefin includes Equistar 8540, an ethylene octene copolymer; Equistar GA-502-024, an LLDPE; Dow DMDA-8904NT 7, an HDPE;

Basell Pro-Fax SR275M, a random polypropylene copolymer; Dow 7C50, a block PP copolymer; or products formerly sold under the tradename Engage by Dupont Dow.

In an example, the blend includes not greater than about 40 wt % polyolefin, such as not greater than about 30 wt % polyolefin. For example, the blends may include not greater than about 20 wt % of the polyolefin, such as not greater than 10 wt %. In a particular example, the blend includes about 5 wt % to about 30 wt %, such as about 10 wt % to about 30 wt %, about 10 wt % to about 25 wt %, or about 10 wt % to about 20 wt %.

In general, the blend exhibits compatibility between the polymeric components. DMA analysis may provide evidence of compatibility. DMA analysis may show a single tan delta peak between glass transition temperatures of major components of a blend, indicating compatibility. Alternatively, an incompatible blend may exhibit more than one tan delta peak. In an example, the blend may exhibit a single tan delta peak. In particular, the single tan delta peak may be between the glass transition temperature of the polyolefin and the glass transition temperature of the diene elastomer.

In general, blend may be cured through cross-linking. In a particular example, the diene elastomer may be cross-linkable through radiation, such as using X-ray radiation, gamma radiation, ultraviolet electromagnetic radiation, visible light radiation, electron beam (e-beam) radiation, or any combination thereof. Ultraviolet (UV) radiation may include radiation at a wavelength or a plurality of wavelengths in the range of from 170 nm to 400 nm, such as in the range of 170 nm to 220 nm. Ionizing radiation includes high-energy radiation capable of generating ions and includes electron beam (e-beam) radiation, gamma radiation, and x-ray radiation. In a particular example, e-beam ionizing radiation includes an electron beam generated by a Van de Graaff generator, an electron-accelerator, or an x-ray. In an alternative embodiment, the diene elastomer may be crosslinkable through thermal methods. In a further example, the diene elastomer may be crosslinkable through chemical reaction, such as a reaction between a silane crosslinking agent and water.

In an exemplary embodiment, the blend may further include a crosslinking agent, a photoinitiator, a filler, a plasticizer, or any combination thereof. Alternatively, the blend may be free of crosslinking agents, photoinitiators, fillers, or plasticizers. In particular, the blend may be free of photoinitiators or crosslinking agents.

To facilitate crosslinking, the material of the elastomeric layer 104 may include a photoinitiator or a sensibilizer composition. For example, when ultra-violet radiation is contemplated as the form of irradiation or when e-beam radiation is contemplated as the form of irradiation, the material may include a photoinitiator to increase the crosslinking efficiency, i.e., degree of crosslinking per unit dose of radiation.

An exemplary photoinitiator includes benzophenone, ortho- and para-methoxybenzophenone, dimethylbenzophenone, dimethoxybenzophenone, diphenoxybenzophenone, acetophenone, o-methoxy-acetophenone, acenaphthenequinone, methyl ethyl ketone, valerophenone, hexanophenone, alpha-phenyl-butyrophenone, p-morpholinopropiophenone, dibenzosuberone, 4-morpholinobenzophenone, benzoin, benzoin methyl ether, 3-o-morpholinodeoxybenzoin, p-diacetyl-benzene, 4-aminobenzophenone, 4'-methoxyacetophenone, alpha-tetralone, 9-acetylphenanthrene, 2-acetyl-phenanthrene, 10-thioxanthenone, 3-acetyl-phenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydrophyranyl ether, 4,4'-bis(dimethylamino)-benzophenone, 1'-acetonaphthone, 2' acetonaphthone, acetonaphthone and 2,3-butanedione, benz[a]anthracene-7,12-dione, 2,2-dimethoxy-2-phenylaceto-phenone, alpha-diethoxy-acetophenone, alpha-dibutoxy-acetophenone, anthraquinone, isopropylthioxanthone, or any combination thereof. An exemplary polymeric initiator may include poly(ethylene/carbon monoxide), oligo[2-hydroxy-2-methyl-1-[4-(1-methylvinyl)-phenyl]propanone], polymethylvinyl ketone, polyvinylaryl ketones, or any combination thereof.

Another exemplary photoinitiator includes benzophenone; anthrone; xanthone; the Irgacure® series of photoinitiators from Ciba-Geigy Corp. including 2,2-dimethoxy-2-phenylacetophenone (Irgacure® 651), 1-hydroxycyclohexylphenyl ketone (Irgacure® 184), or 2-methyl-1-[4-(methylthio)phenyl]-2-morpholino propan-1-one (Irgacure® 907); or any combination thereof. Generally, the photoinitiator exhibits low migration from the material of the elastomeric layer 104. In addition, the photoinitiator typically has a low vapor pressure at extrusion temperatures and sufficient solubility in the polymer or polymer blends of the elastomeric layer 104 to yield efficient crosslinking. In an exemplary embodiment, the vapor pressure and solubility, or polymer compatibility, of the photoinitiator may be improved by derivatizing the photoinitiator. An exemplary derivatized photoinitiator includes, for example, higher molecular weight derivatives of benzophenone, such as 4-phenylbenzophenone, 4-allyloxybenzophenone, 4-dodecyloxybenzophenone, or any combination thereof. In an example, the photoinitiator may be covalently bonded to a polymer of the material of the elastomeric layer 104.

In an exemplary embodiment, the material of the elastomeric layer 104 includes about 0.0 wt % to about 3.0 wt % photoinitiator, such as about 0.1 wt % to about 2.0 wt %.

Crosslinking may also be facilitated by a chemical crosslinking agent, such as a peroxide, an amine, a silane, or any combination thereof. In an exemplary embodiment, the material of the elastomeric layer 104 may be prepared by dry blending solid state forms of polymer and the crosslinking agent, i.e., in powder form. Alternatively, the material may be prepared in liquid form, sorbed in inert powdered support or by preparing coated pellets, or the like.

An exemplary thermally activatable crosslinking agent includes a free radical generating chemical, which when exposed to heat decomposes to form at least one, and typically two or more free radicals to effect crosslinking. In an exemplary embodiment, the crosslinking agent is an organic crosslinking agent including an organic peroxide, an amine, a silane, or any combination thereof.

An exemplary organic peroxide includes 2,7-dimethyl-2,7-di(t-butylperoxy)octadiyne-3,5; 2,7-dimethyl-2,7-di(peroxy ethyl carbonate)octadiyne-3,5; 3,6-dimethyl-3,6-di(peroxy ethyl carbonate)octyne-4; 3,6-dimethyl-3,6-(t-butylperoxy)octyne-4; 2,5-dimethyl-2,5-di(peroxybenzoate) hexyne-3; 2,5-dimethyl-2,5-di(peroxy-n-propyl carbonate) hexyne-3; 2,5-dimethyl-2,5-di(peroxy isobutyl carbonate) hexyne-3; 2,5-dimethyl-2,5-di(peroxy ethyl carbonate) hexyne-3; 2,5-dimethyl-2,5-di(alpha-cumyl peroxy)hexyne-3; 2,5-dimethyl-2,5-di(peroxy beta-chloroethyl carbonate) hexyne-3; 2,5-dimethyl-2,5-di(t-butylperoxy) hexyne-3; or any combination thereof. A particular crosslinking agent is 2,5-dimethyl-2,5-di(t-butyl peroxy)hexyne-3, available from Elf Atochem under the trade designation Lupersol 130. Another exemplary crosslinking agent is dicumyl peroxide, available from Elf Atochem as Luperox 500R. In a particular embodiment, the crosslinking agent is present in the material in an amount between about 0.1 wt % to about 5.0 wt %, such as about 0.5 wt % to about 2.0 wt % based on the weight of the material.

An exemplary silane crosslinking agent has the general formula:

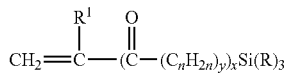

in which R1 is a hydrogen atom or methyl group; x and y are 0 or 1 with the proviso that when x is 1, y is 1; n is an integer from 1 to 12, preferably 1 to 4, and each R independently is a hydrolyzable organic group such as an alkoxy group having from 1 to 12 carbon atoms (e.g., methoxy, ethoxy, butoxy), aryloxy group (e.g., phenoxy), araloxy group (e.g., benzyloxy), aliphatic acyloxy group having from 1 to 12 carbon atoms (e.g., formyloxy, acetyloxy, propanoyloxy), amino or substituted amino groups (e.g., alkylamino, arylamino), or a lower alkyl group having 1 to 6 carbon atoms, with the proviso that not more than one of the three R groups is an alkyl. Such silanes may be grafted to a polymer through the use of an organic peroxide. Additional ingredients such as heat and light stabilizers, pigments, or any combination thereof, also may be included in the material. In general, the crosslinking reaction may result from a reaction between the grafted silane groups and water. Water may permeate into the bulk polymer from the atmosphere or from a water bath or "sauna". An exemplary silane includes an unsaturated silane that comprise an ethylenically unsaturated hydrocarbyl group, such as a vinyl, allyl, isopropenyl, butenyl, cyclohexenyl or gamma-(meth)acryloxy allyl group, and a hydrolyzable group, such as, for example, a hydrocarbyloxy, hydrocarbonyloxy, or hydrocarbylamino group. An example of a hydrolyzable group includes a methoxy group, an ethoxy group, a formyloxy group, an acetoxy group, a proprionyloxy group, an alkyl group, an arylamino group, or any combination thereof. A particular silane is an unsaturated alkoxy silanes that can be grafted onto the polymer. In particular, the silane may include vinyl trimethoxy silane, vinyl triethoxy silane, gamma-(meth)acryloxy propyl trimethoxy silane, or any combination thereof.

The amount of silane crosslinker may vary widely depending upon the nature of the blend, the silane, the processing conditions, the grafting efficiency, the ultimate application, and similar factors. Typically, at least 0.5 parts per hundred resin (phr), such as at least about 0.7 phr, is used. Generally, the amount of silane crosslinker does not exceed 5 phr, such as not greater than about 2 phr.

In another exemplary embodiment, an amine crosslinking agent may include a monoalkyl, duallyl or trialkyl monoamine, wherein the alkyl group contains from about 2 to about 14 carbon atoms; a trialkylene diamine of the formula $N(R^2)_3N$; a dialkylene diamine of the formula $HN(R^2)_2NH$; an alkylene diamine, $H_2NR^2NH_2$; a dialkylene triamine, $H_2NR^2NHR^2NH_2$; an aliphatic amine having a cyclic chain of from four to six carbon atoms; or any combination thereof. The alkylene group $R^2$ in the above formulae may include from about 2 to about 14 carbon atoms. An exemplary cyclic amine may have a heteroatom, such as oxygen, for example, an N-alkyl morpholine. Another exemplary cyclic amine includes pyridine, N,N-dialkyl cyclohexylamine, or any combination thereof. An exemplary amine is triethylamine; di-n-propylamine; tri-n-propylamine; n-butylamine; cyclohexylamine; triethylenediamine; ethylenediamine; propylenediamine; hexamethylenediamine; N,N-diethyl cyclohexylamine; pyridine; ethyl-p-dimethyl amine benzoate (EDAB); octyl-p-dimethyl aminobenzoate (ODAB); or any combination thereof. In an exemplary embodiment, the material includes from about 0.5 wt % to about 10.0 wt % of the amine.

In a particular example, curing is enhanced using FirstCure ITX, available from Albemarle, Inc. FirstCure ITX may also be used in conjunction with an amine synergist, such as ethyl-p-dimethyl amine benzoate (EDAB) or octyl-p-dimethyl aminobenzoate (ODAB).

Returning to FIG. 1, the multi-layer film 100 may be formed through a method, such as coextrusion, colamination, extrusion lamination, melt coating of a preformed layer, or comolding. In particular, co-extrusion may produce a film or a sheet. For example, a sheet of each layer 102, 104, and optionally, 106 may be extruded and placed together while in a heat-softened condition in the co-extrusion die or after the outlet of the die to form a pre-formed article. When chemical crosslinkers are present, crosslinking may occur. Alternatively, the sheet may be subjected to radiation crosslinking.

Once the multilayer article is pre-formed, crosslinking may be performed. In an example, crosslinking may effect bonding of the layers 102, 104, and optionally, 106 together. Such crosslinking may alter mechanical properties of the elastomeric layer 104 and improve peel strength between the layers 102, 104, and 106. Crosslinking may be performed at elevated temperature, such as when the layers 102, 104, and optionally, 106 are placed together at above the melting point of either component, at room temperature, or at any temperature in between.

To illustrate crosslinking by radiation, a film is prepared by the extrusion process. In the extrusion process, the material of layer 102, the material of layer 104, and optionally, the material of layer 106 may be separately melted and separately supplied or jointly melted and supplied to a co-extrusion feed block and die head wherein a film including the layers 102, 104, and optionally 106 is generated. An exemplary die employs a "coat hanger" type configuration. An exemplary linear coat hanger die head is commercially available from Extrusion Dies, Inc. (Connecticut) or Cloeren Die Corp., (Texas). In an exemplary embodiment, the coextruded multilayer film is drawn at a ratio not greater than 30:1, such as not greater than 20:1. Alternatively, the extruded layers may be pressed together at pressures in the range of 0.1 MPa to 80 MPa.

Once the film is formed, radiation crosslinking may be immediately performed and the film may be rolled. Alternatively, the film may be rolled in an uncrosslinked state, unrolled at a later time and subjected to radiation crosslinking.

The radiation may be effective to create crosslinks in the crosslinkable polymer of the layer 104. The intralayer crosslinking of polymer molecules within the layer 104 provides a cured composition and imparts structural strength to the layer 104 of the multi-layer film 100. In addition, radiation may effect a bond between an outermost layer 102 formed of a fluoropolymer and the core layer 104, such as through interlayer crosslinking. In a particular embodiment, the combination of interlayer crosslinking bonds between the layers and the cured core layer present an integrated composite that is highly resistant to delamination, has a high quality of adhesion resistant and protective surface, incorporates a minimum amount of adhesion resistant material, and yet, is physically substantial for convenient handling and deployment of the multilayer film 100. For example, the multilayer film may exhibit a peel strength of at least about 5 gm/cm of width, when tested in standard "T"-Peel configuration at room temperature. In particular, thinner films below 1 mil in thickness may have a peel strength of at least about 5 gm/cm, such as at least about 10 gm/cm. In another example, the peel strength of the multilayer film may be at least about 30 gm/cm, such as at least about 40 gm/cm, at least about 45 gm/cm, or even at least about 50 gm/cm. In particular, thicker films or films used in conjunction with adhesive tapes over a wide temperature range may have peel strengths of at least about 30 gm/cm.

In a particular embodiment, the radiation may be ultraviolet electromagnetic radiation having a wavelength between 170 nm and 400 nm, such as about 170 nm to about 220 nm. Crosslinking may be effected using at least about 120 J/cm² radiation.

Once formed and cured, the multi-layer polymer film may exhibit desirable mechanical properties. For example, the multi-layer polymer film may have a tensile strength of at least about 12 MPa, based on ASTM D882-02 testing methods. For example, the multi-layer film may have a tensile strength of at least about 15 MPa, such as at least about 20 MPa.

In another exemplary embodiment, the multi-layer film exhibits a desirable elongation at ultimate tensile strength based on ASTM D882-02 testing methods. For example, the multi-layer film may exhibit an elongation at ultimate tensile strength of at least about 145%, such as at least about 170% or at least about 200%.

Particular embodiments of a multilayer film including a core layer formed of a blend of EPDM and polyolefin and including an outermost layer formed of fluoropolymer may advantageously exhibit improved mechanical properties while maintaining crosslinkability and interlayer bonding. For example, embodiments of a multilayer film including a core layer formed of a blend of EPDM and not greater than about 40 wt % polyolefin and an outermost layer of fluoropolymer may exhibit improved tensile strength and elongation at ultimate tensile strength. Further embodiments of a multilayer film including a core layer formed of a blend of EPDM and not greater than about 40 wt % polyolefin and an outermost layer of fluoropolymer may exhibit intracrosslinking within the core layer and bonding between the core layer and the outermost layer of fluoropolymer without the use of an intervening adhesive layer. In addition, embodiments including a blend may include layers that exhibit similar responses to mechanical stress, reducing interfacial separating in response to mechanical stress.

EXAMPLES

Five polymers are selected for a blending study. Specifically, blends are formed that include EPDM and one of five commercially available polyolefins. The commercially available polyolefins are Equistar 8540, an ethylene octene copolymer; Equistar GA-502-024, an LLDPE; Dow DMDA-8904NT 7, an HDPE; Basell Pro-Fax SR275M, a random polypropylene copolymer; and Dow 7C50, a block PP copolymer. The selected EPDM grade is Nordel 4725, available from Dupont-Dow. A blend including the EPDM and at least one polyolefin is included as an intermediate or core layer of a multi-layer film that includes outermost layers formed from Daikin NP-12X FEP. The multi-layer film is coextruded and exposed to ultraviolet electromagnetic radiation, curing the blend of the core layer.

The multi-layer films are coextruded to 1 mil in thickness and exposed to ultraviolet radiation generated by an H+ bulb included in a Fusion UV Systems Model VPS-6 system. The samples are exposed through multiple passes to ultraviolet radiation for a total exposure of 129 J/cm². The blends did not include a photoinitiator.

Example 1

Dynamic mechanical analysis (DMA) is used to evaluate the compatibility of the blends. The tan delta peak of a DMA scan provides the glass transition temperature ($T_g$) for the overall blend. In a compatible system, the $T_g$ moves according to the relative amounts of each component in the binary blend, i.e., the $T_g$ for the blend has an intermediate value relative to the glass transition temperature of the two components and the $T_g$ value changes according to the relative amounts of the components. Alternatively, an incompatible blend behaves as at least two different materials and at least two tan delta peaks appear in the DMA scan. Each of the blends in the above-described samples exhibits a single tan delta peak between the glass transition temperatures of the component polymers.

Example 2

Mechanical properties, such as the tensile strength and the percent elongation at ultimate tensile strength, of the samples are tested. The procedure follows ASTM D882-02. A cross head speed of 20 inches per minute with a 5 kN load cell is used. The samples are conditioned at 23° C. and 50 relative humidity (RH) for twelve hours prior to testing.

TABLE 1

Mechanical Properties for Films including Polymer Blends

| Polyolefin in Blend | Tensile Strength (MPa) | | |
|---|---|---|---|
| | 10 wt % | 20 wt % | 30 wt % |
| Ethylene Octene (Engage 8540) | 21.9 | 20.3 | 16.1 |
| LLDPE (Equistar) | 26.6 | 24.3 | 24.3 |
| HDPE (Dow DMDA) | 16.0 | 19.6 | 19.6 |
| PP (Dow 7C50) | 16.7 | 17.4 | 23.7 |
| PP (Basell ProFax) | 18.1 | 20.7 | 24.0 |

A comparative sample including 100% Nordel 4725 EPDM as a core layer has a tensile strength of 12.5 MPa. As illustrated in Table 1, each of the samples exhibits a tensile strength of at least about 12 MPa. Many of the samples including blends in intermediate or core layers exhibit a tensile strength of at least about 15 MPa and particular samples exhibit a tensile strength greater than 20 MPa. In general, addition of a polyolefin to the blend of the core layer increases the tensile strength of the sample relative to a sample including 100% Nordel 4725 EPDM in the core layer. Particular samples, such as the sample including a blend including linear low density polyethylene blend and the sample including a blend including ethylene octene copolymer exhibit peak tensile strength at approximately 10%. Other samples exhibit an increasing tensile strength at amounts as high as 30%, such as the sample including a blend including high density polyethylene and the sample including the blend including polypropylene block copolymer.

Percent elongation at ultimate tensile strength is also measured. A comparative sample including 100% Nordel 4725 EPDM as a core layer has an elongation at ultimate tensile strength of 149%. Table 2 includes the percent elongation for the above-described samples. Each of the samples exhibits an elongation at ultimate tensile strength of at least about 147%. The sample including the ethylene octene copolymer blend exhibits a peak percent elongation at a composition of between 10 and 20% of the ethylene octene copolymer. Other samples, such as the sample including the LLDP blend and the sample including the polypropylene random copolymer blend, exhibit increasing percent elongation at 30%.

TABLE 2

Mechanical Properties for Films including Polymer Blends

| Polyolefin in Blend | Elongation at Ultimate Tensile Strength (%) | | |
|---|---|---|---|
| | 10 wt % | 20 wt % | 30 wt % |
| Ethylene Octene (Engage 8540) | 250 | 240 | 111 |
| LLDPE (Equistar) | 172 | 220 | 240 |
| HDPE (Dow DMDA) | 196 | 205 | 194 |
| PP (Dow 7C50) | 198 | 226 | 223 |
| PP (Basell ProFax) | 154 | 188 | 236 |

Example 3

Thermal behavior of a set of samples including a blend of Engage® 8540 polyolefin and Nordel 4725 as a core layer are tested for thermal behavior using a Vicat probe. Multi-layer films including a core layer encapsulated by FEP layers are formed. Samples include a core layer formed of a material selected from 100% EPDM Nordel 4725, a blend including Nordel 4725 and 10% Engage® 8540 polyolefin, or a blend including Nordel 4725 and 30% Engage® 8540 polyolefin. The samples are UV treated using an H+ bulb. In addition, an untreated sample is tested.

FIG. 1 includes a graphic illustration of probe height relative to temperature. The untreated sample exhibits a quick drop in probe height with increased temperature. In contrast, each of the UV treated samples including polyolefin exhibit a similar change in probe height relative to temperature to the change in probe height of the 100% EPDM sample. As such, the core layer may crosslink in the samples including a blend of EPDM and as much as 30% polyolefin. In addition, the outermost layers of FEP may adhere to layers including blends of EPDM and about 30% polyolefin or less, without the use of an intermediate adhesive layer.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A multilayer film comprising:
a first layer comprising a blend of a polyolefin and a diene elastomer, the diene elastomer including ethylene propylene monomer (EPDM) elastomer; and
a second layer directly contacting and directly bonded to the first layer, the second layer comprising a fluoropolymer;
a third layer bonded directly to and directly contacting the first layer, wherein the third layer includes fluoropolymer.

2. The multilayer film of claim 1, wherein the diene monomer of the ethylene propylene diene monomer (EPDM) elastomer includes an alkenyl norbornene.

3. The multilayer film of claim 1, wherein the polyolefin includes polypropylene.

4. The multilayer film of claim 1, wherein the polyolefin includes polyethylene.

5. The multilayer film of claim 4, wherein the polyethylene includes high density polyethylene.

6. A multilayer film comprising:
a first layer comprising a blend of polyolefin and ethylene propylene diene monomer (EPDM) elastomer;
a second layer directly contacting and directly bonded to the first layer, the second layer comprising a fluoropolymer, wherein the fluoropolymer includes fluorinated ethylene propylene copolymer (FEP); and
a third layer bonded directly to and directly contacting the first layer, wherein the third layer includes fluorinated ethylene propylene copolymer (FEP).

7. The multilayer film of claim 6, wherein a diene monomer of the ethylene propylene diene monomer (EPDM) elastomer includes an alkenyl norborene.

8. The multilayer film of claim 6, wherein the polyolefin includes polypropylene.

9. The multilayer film of claim 6, wherein the polyolefin includes polyethylene.

10. The multilayer film of claim 9, wherein the polyethylene includes high density polyethylene.

* * * * *